United States Patent [19]
Takahashi et al.

[11] Patent Number: 5,815,618
[45] Date of Patent: Sep. 29, 1998

[54] ADAPTOR FOR INTERCONNECTING OPTICAL FIBERS

[75] Inventors: Tsunehiro Takahashi, Yamato; Akihiro Miyachi, Fuchu, both of Japan

[73] Assignee: Molex Incorporated, Lisle, Ill.

[21] Appl. No.: 863,452

[22] Filed: May 27, 1997

[30] Foreign Application Priority Data

Jun. 7, 1996 [JP] Japan ................. 8-168551
Jul. 5, 1996 [JP] Japan ................. 8-195570

[51] Int. Cl.⁶ ............................. G02B 6/38
[52] U.S. Cl. .......................... 385/60; 385/72
[58] Field of Search ............... 385/60, 72, 78, 385/58, 59, 56, 55, 75, 83, 88, 89, 80, 82, 85

[56] References Cited

U.S. PATENT DOCUMENTS

| | | | |
|---|---|---|---|
| 4,140,365 | 2/1979 | Burger et al. | 350/96.2 |
| 4,490,007 | 12/1984 | Murata | 385/64 |
| 4,687,292 | 8/1987 | Krausse | 350/96.21 |
| 4,762,389 | 8/1988 | Kaihara et al. | 385/60 |
| 4,808,115 | 2/1989 | Norton et al. | 439/79 |
| 4,892,379 | 1/1990 | Takeda et al. | 385/60 |
| 4,950,048 | 8/1990 | Kakii et al. | 385/83 |
| 5,113,462 | 5/1992 | Clancy et al. | 385/53 |
| 5,246,376 | 9/1993 | Schuhl et al. | 439/98 |
| 5,420,951 | 5/1995 | Marazzi et al. | 385/75 |
| 5,528,711 | 6/1996 | Iwano et al. | 385/56 |
| 5,537,501 | 7/1996 | Iwano et al. | 385/58 |
| 5,672,346 | 9/1997 | Iwano et al. | 385/60 |

FOREIGN PATENT DOCUMENTS

| | | | |
|---|---|---|---|
| 0323920 A2 | 7/1989 | European Pat. Off. | G02B 26/02 |
| 0430107 A2 | 6/1991 | European Pat. Off. | G02B 6/38 |
| 0731369 A2 | 9/1996 | European Pat. Off. | G02B 6/38 |
| 0784218 A1 | 7/1997 | European Pat. Off. | G02B 6/36 |

*Primary Examiner*—Akm E. Ullah
*Attorney, Agent, or Firm*—A. A. Tirva

[57] ABSTRACT

Disclosed optical fiber connector adaptor includes a guide cylinder to accommodate two ferrules each attached to an end of a different optical fiber, which are to be connected to each other with their optical axes aligned by inserting the ferrules in the guide cylinder from its opposite sides. The adaptor has outer and inner hollow bodies which are adapted to telescope within each other during assembly. Each hollow body has a cylindrical holder to surround and hold the guide cylinder allowing an optical fiber connector having a ferrule at its end to be press-fit in the outer hollow body until the ferrule is inserted in the guide cylinder. The inner hollow tube permits the press-fit of a ferrule, which is attached to the end of another optical fiber, into the guide cylinder on the open side of the inner hollow body.

3 Claims, 7 Drawing Sheets

ADAPTOR FOR INTERCONNECTING OPTICAL FIBERS

BACKGROUND OF THE INVENTION

1. Field of the Invention

The present invention relates to an adaptor for establishing a connection between two optical fibers.

2. Description of Prior Art

In making an end-to-end connection between two optical fibers with their optical axes aligned, each of these optical fibers is terminated with an optical fiber connector, and an adaptor is used to align the fiber optical axes by insertion of the connectors into opposite inlets of the adaptor. The adaptor has a guide cylinder for accommodating ferrules of both connectors thereby allowing the ends of optical fibers to abut on each other in the guide cylinder when the optical connectors are inserted into the adaptor from opposite directions.

Thus, in the prior art arrangement, each of the two optical fibers to be connected must be terminated with an optical fiber connector. The connector is expensive to manufacture and to assemble.

SUMMARY OF THE INVENTION

It is one object of the present invention to provide an arrangement for establishing an end-to-end connection between two optical fibers and align their optical axes without utilizing two connectors.

While both fibers have to be terminated in a ferrule, the invention contemplates mounting only one ferrule in a conventional connector. The other ferrule is mounted in an optical fiber plug. An adaptor is provided which accommodates the optical plug on the side and a conventional optical connector at the other side to align the optical fibers and establish a connection between the fibers.

Other objects and advantages of the present invention will be understood from the following description of the adaptor and plug according to a preferred embodiment of the present invention, which is shown in accompanying drawings.

DESCRIPTION OF PREFERRED EMBODIMENTS

Figure 1:
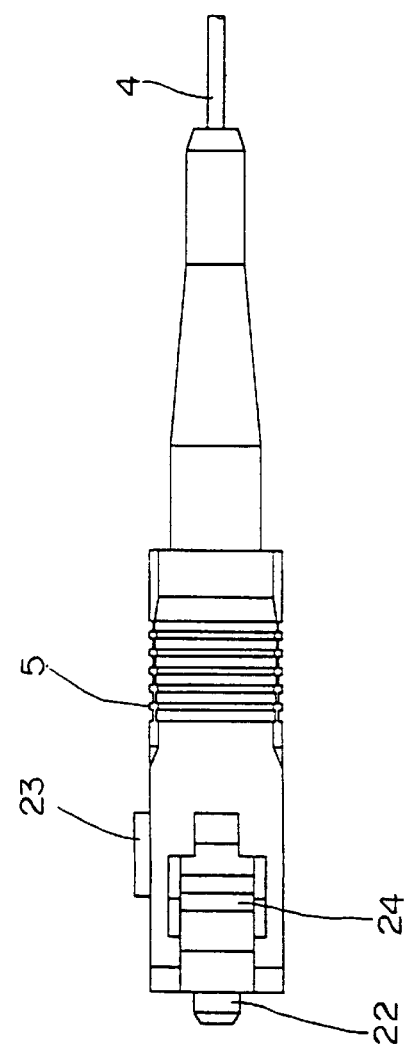
FIG. 1 is a longitudinal section, illustrating how an adaptor according to the present invention is used.
Figure 1:
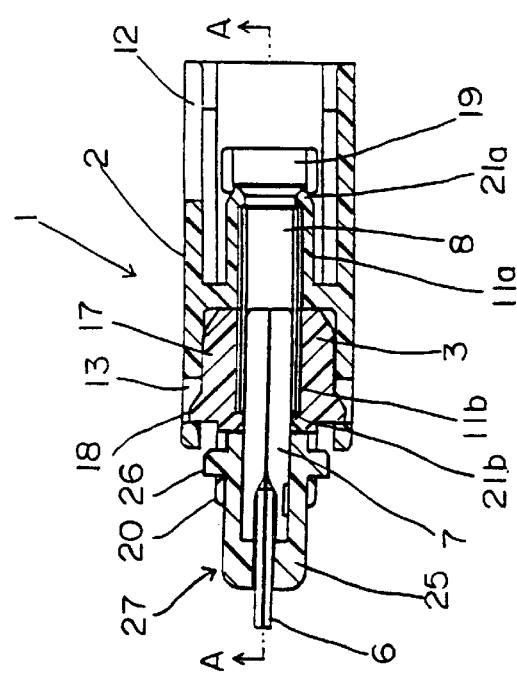
Figure 2:
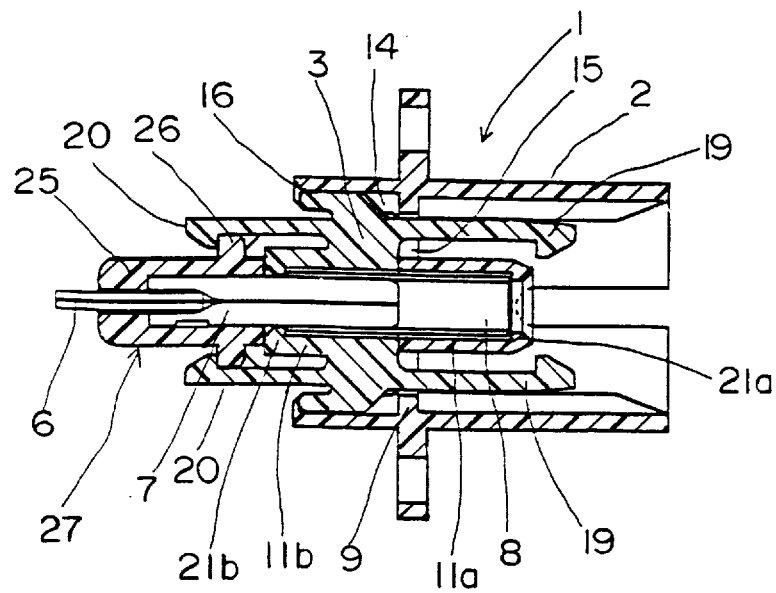
FIG. 2 is a longitudinal section of the adaptor and an optical fiber plug when nested together.

FIGS. 1 and 2 show how an adaptor 1 for making an end-to-end connection of optical fibers 4 and 6 is used. It includes an outer hollow body 2 and an inner hollow body 3. An optical fiber connector 5 terminates optical fibers 4 and an optical fiber plug 27 terminates optical fiber 6. Connector 5 is press-fit in the open side (the right side in FIGS. 1 and 2) of the outer hollow body 2. The plug 27 is press-fit in the inner hollow body 3.

The outer and inner hollow bodies 2 and 3 are designed to be assembled such that the mating end (i.e. the right side in FIGS. 1 and 2) of the inner hollow body 3 telescopes into the mating end (i.e. the left side in these drawings) of the outer hollow body 2. A guide cylinder 8 is located inside the adaptor 1. Referring to FIGS. 3 to 8, the outer hollow body 2 has a rectangular, box-like shape, an inner partition wall 9 at its middle section, and two opposite flanges 10 extending outward from the inner partition 9. The inner partition wall 9 has a cylindrical holder 11a integrally connected thereto. Referring to FIGS. 9 to 14, the inner hollow body 3 is adapted such that it may be partly telescoped into the outer hollow body 2 and has a cylindrical holder 11b to communicate with the cylindrical holder 11a when the inner hollow body 3 is telescoped in the outer hollow body 2. The guide cylinder 8 is held in a channel provided by the communicating cylindrical holders 11a and 11b.

Figure 3:
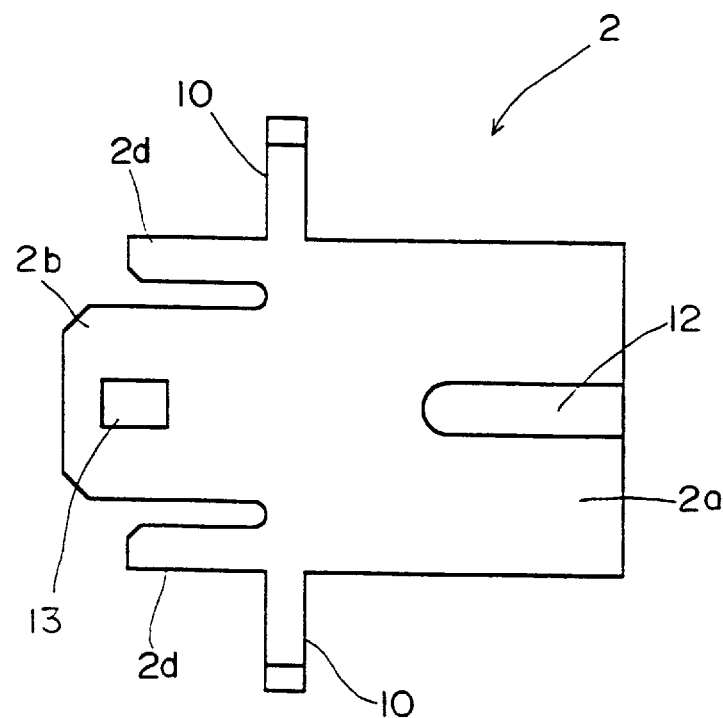
FIG. 3 is a top view of the outer hollow body of the adaptor.
Figure 4:
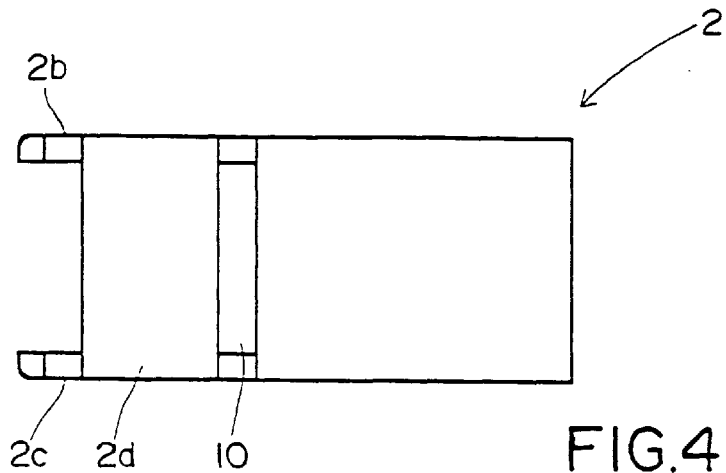
FIG. 4 is a front view of the outer hollow body.
Figure 5:
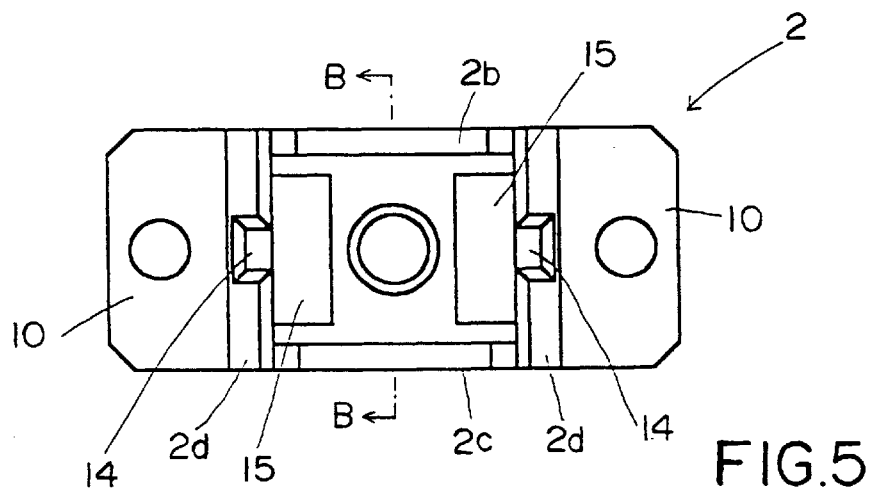
FIG. 5 is a side view of the outer hollow body as viewed from the left side of FIG. 4.
Figure 6:
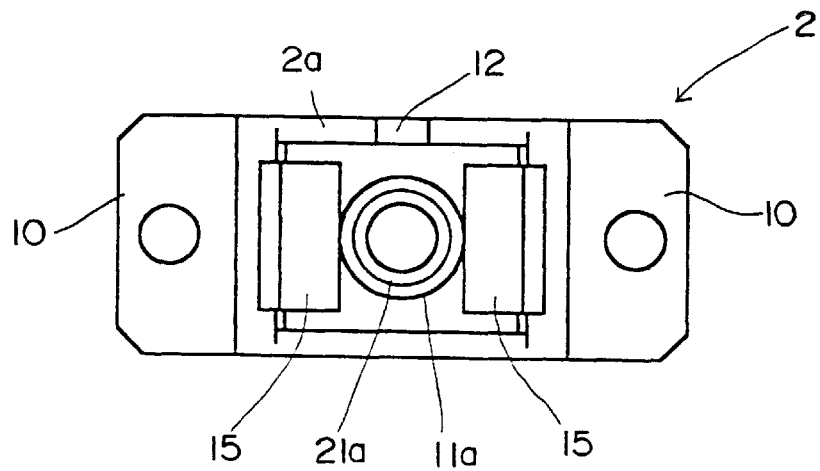
FIG. 6 is a side view of the outer hollow body as viewed from the right side of FIG. 4.
Figure 7:
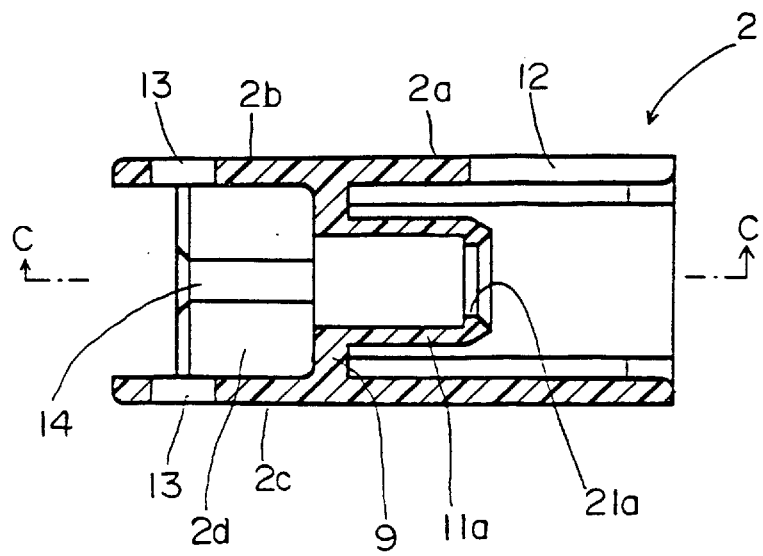
FIG. 7 is a longitudinal section of the outer hollow body taken along the line B—B in FIG. 5.
Figure 8:
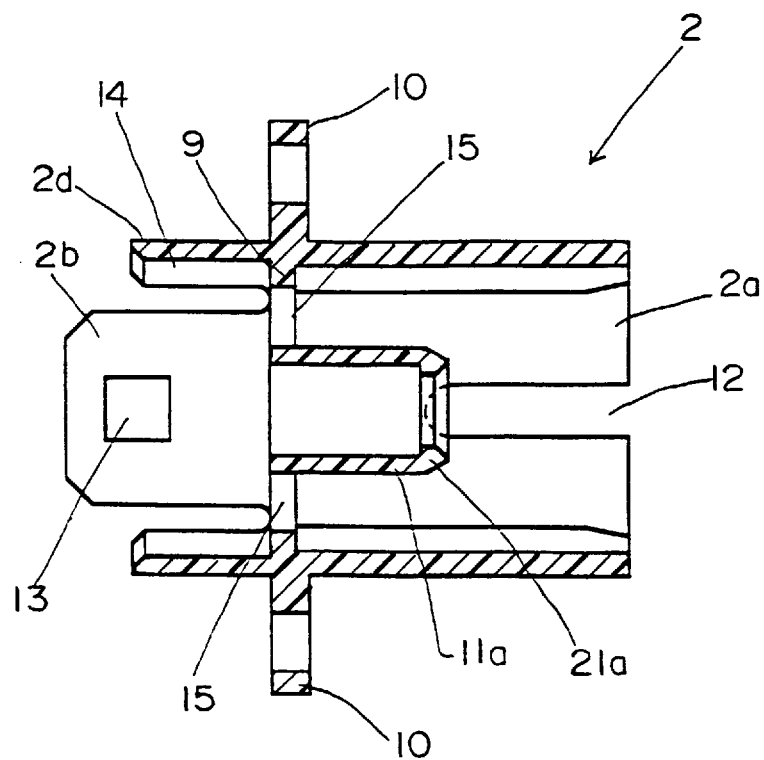
FIG. 8 is a longitudinal section of the outer hollow body taken along the line C—C in FIG. 7.

The outer hollow body 2 has a keyway 12 made in its top wall 2a on the open side (i.e. the right side in FIG. 3), and rectangular holes 13 made in its top and bottom walls on the mating side (i.e. the left side in FIG. 3). Each of the opposite side walls 2d has a longitudinal guide slot 14 made at its middle. The partition wall 9 has rectangular openings 15 on both sides of the cylindrical holder 11a.

The inner hollow body 3 has projections 16 integrally connected to the cylindrical holder 11b to follow the guide slots 14 of the opposite side walls 2d, and it has engagement projections 17 integrally connected to the upper and lower sides of the cylindrical holder 11b. These engagement projections 17 diverge backward, as indicated at 18 in FIG. 10, thereby permitting the inner hollow body 3 to be engaged by its crest 18 when snapped into the rectangular holes 13 of the outer hollow body 2.

Figure 9:
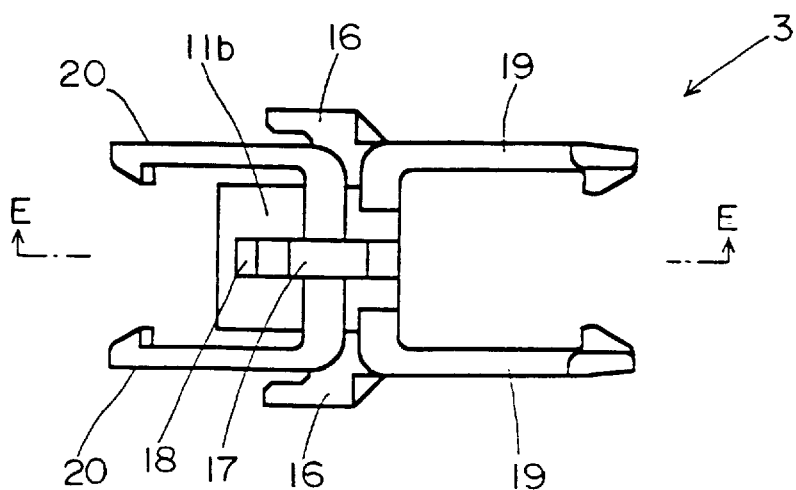
FIG. 9 is a top view of the inner hollow body of the adaptor.
Figure 10:
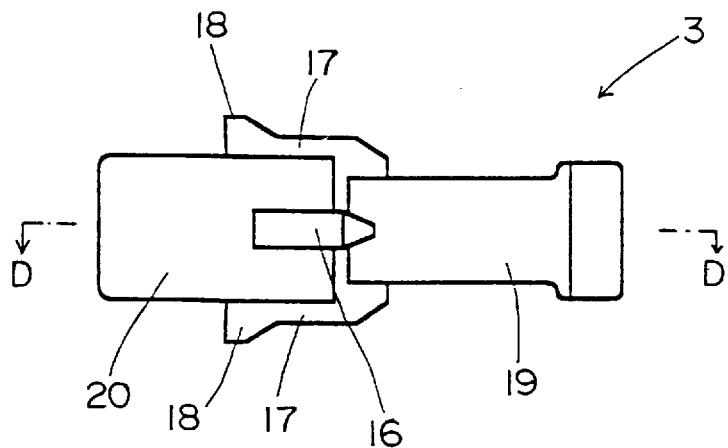
FIG. 10 is a front view of the inner hollow body.
Figure 11:
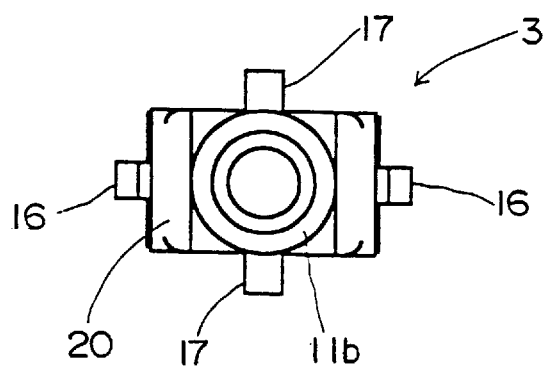
FIG. 11 is a side view of the inner hollow body as viewed from the left side of FIG. 9.
Figure 12:
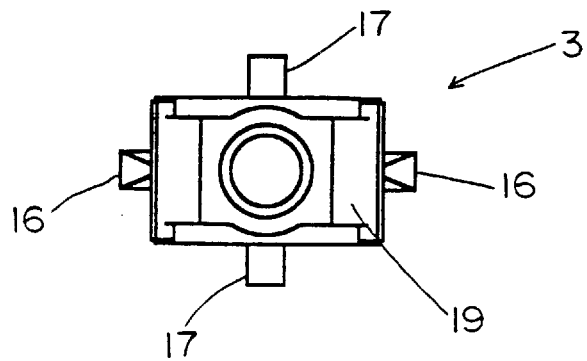
FIG. 12 is a side view of the inner hollow body as viewed from the right side of FIG. 9.
Figure 13:
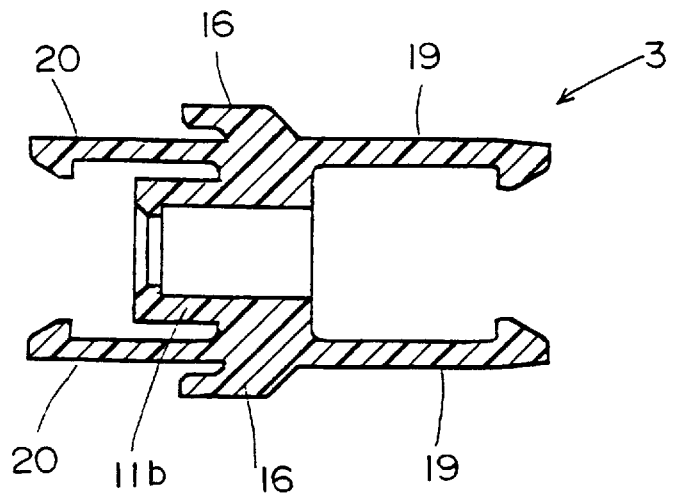
FIG. 13 is a longitudinal section of the inner hollow body taken along the line D—D in FIG. 10.
Figure 14:
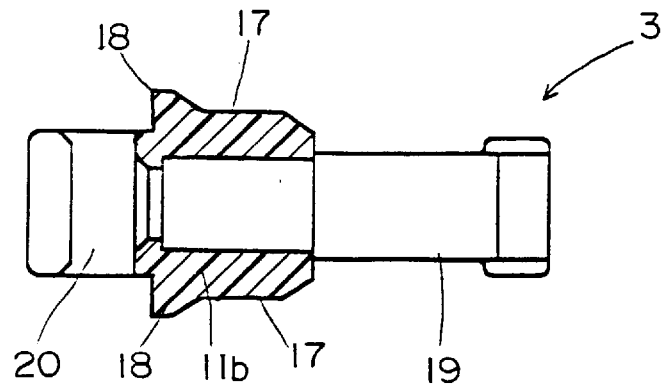
FIG. 14 is a longitudinal section of the inner hollow body taken along the line E—E in FIG. 9.

The inner hollow cylinder 3 has a pair of connector latching arms 19 integrally connected to the cylindrical holder 11b and extending forward (i.e. the right side in FIG. 9), and it has a pair of holder latching arms 20 integrally connected to the cylindrical holder 11b and extending backward (i.e. the left side in FIG. 9).

All adaptor parts are assembled into the adaptor 1 as follows: the guide cylinder 8 is inserted in one of the cylindrical holders 11a or 11b, and the inner hollow body 3 is partly press-fitted in the outer hollow body 2, allowing the connector latching arms 19 of the inner hollow body 3 to pass through the rectangular openings 15 of the partition wall 9 of the outer hollow body 2, extending toward the open side of the outer hollow body 2. The projections 16 of the cylindrical holder 11b are engaged by the guide slots 14 of the opposite side walls 2d of the outer hollow body 2. The inner hollow body 3 is advanced into the outer hollow body 2 until the crests 18 of the inner hollow body 3 have been engaged by the rectangular openings 13 made in the top 2d and bottom 2c walls of the outer hollow body 2. Thus, the outer and inner hollow bodies 2 and 3 are integrally connected with their cylindrical holders 11a and 11b aligned, and the guide cylinder 8 is located in the aligned cylindrical holders 11a and 11b. The guide cylinder is engaged by annular projections 21a and 21b of the cylindrical holders 11a and 11b maintaining the guide cylinder 8 within the adaptor 1.

The end-to-end connection of the optical fibers 4 and 6 is made as follows. A ferrule 22 is attached to the end of the optical fiber 4 and the ferrule 22 is fitted in the optical fiber connector 5. The connector 5 is press-fit in the open end of the outer hollow body 2 of the adaptor 1. The optical fiber connector 5 has a projection 23 adapted to engage keyway 12 of the outer hollow body 2 thereby assuring the correct orientation of the connector. When the optical fiber connector 5 is inserted into the open end of the outer hollow body 2, allowing the projection 23 to follow the keyway 12, the ferrule 22 is allowed to enter the guide cylinder 8. At the same time, the connector latching arms 19 of the outer hollow body 2 engage the end of the optical fiber connector 5. Thus, the optical fiber connector 5 is positively retained in the outer hollow body 2.

Figure 15:
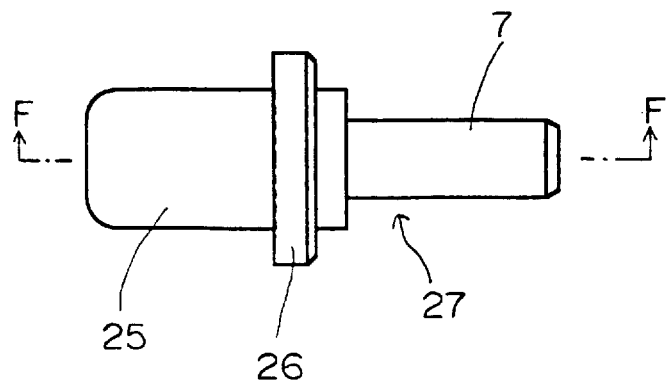
FIG. 15 is a front view of an optical fiber plug according to the present invention.
Figure 16:
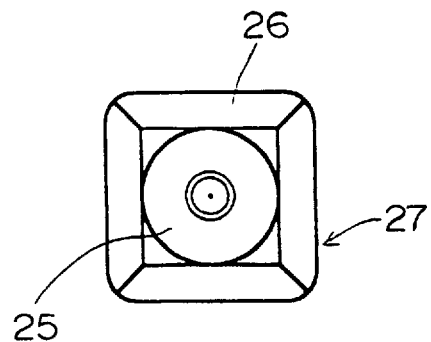
FIG. 16 is a side view of the optical fiber plug as viewed from the left side of FIG. 15.
Figure 17:
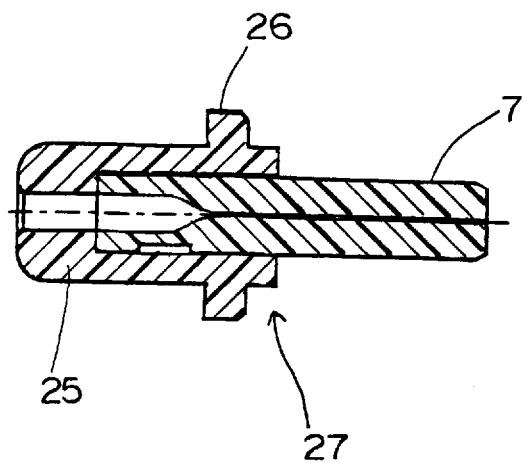
FIG. 17 is a longitudinal section of the optical fiber plug taken along the line F—F in FIG. 15.

The optical fiber 6 is fitted in the ferrule 7 and is directly inserted in the open end of the inner hollow body 3. Referring to FIGS. 15 to 17, the ferrule 7 has an optical fiber plug 27 having a holder 25 integrally connected to its base, and the holder 25 has an annular collar 26 integrally connected to its circumference. The so constructed ferrule 7 is attached to the end of the optical fiber 6, and then, the ferrule 7 is directly inserted into the inner hollow body 3 until it has abutted on the ferrule 22 of the optical fiber connector 5, and the annular collar 26 of the holder 25 of the optical fiber plug 27 is engaged by the ferrule-latching arms 20 of the inner hollow body 3. Thus, the ferrule 22 is positively retained in the inner hollow body 3.

The annular collar 26 is square. Selected opposite sides of the square collar 26 can be conveniently engaged by the ferrule-latching arms 20, and the square collar 26 can be conveniently rotated 90 degrees to center the optical fiber 6 relative to the optical fiber 4. The annular collar 26 may have a hexagon, octagon or any other polygon shape having a rotationally symmetric axis.

As may be understood from the above, the number of ferrules to which optical fibers are to be attached and which then have to be mounted in a connector can be reduced to one, and accordingly the end-to-end connection between two optical fibers can be made at an increased efficiency.

We claim:

1. An adaptor assembly for interconnecting a pair of opposing optical fibers generally along an optical axis, each fiber being terminated in its respective ferrule, one of the ferrules mounted in an optical fiber connector and the other ferrule mounted in an optical fiber plug, the adaptor assembly being constructed as a double ended receptacle for receiving the connector and the plug in opposite open ends thereof, the adaptor assembly further including an outer and an inner hollow body constructed to allow the inner body to telescope within the outer body, a guide cylinder mounted in the adaptor assembly for accommodating and aligning the two ferrules, interengagement means between the outer and inner bodies for locking the bodies together, means for releasably mounting the optical fiber connector in one side of the adaptor with the end of its ferrule located within the guide cylinder and means for releasably mounting the plug in the opposite side of the adaptor with the end of its ferrule located within the guide cylinder.

2. An adaptor assembly as set forth in claim 1, wherein the optical fiber plug includes a cylindrical base having an annular collar extending therefrom and wherein the means for releasably mounting the plug includes at least one latching arm extending from the inner body for engaging the annular collar thereby maintaining the plug within the adaptor assembly.

3. An adaptor assembly as set forth in claim 2, wherein said annular collar has a symmetrical rotation axis formed on the outer side thereof.

* * * * *